A. REED.
LAND BREAKING PLOW.
APPLICATION FILED APR. 8, 1913.

1,071,576.

Patented Aug. 26, 1913.
2 SHEETS—SHEET 1.

Witnesses
Jw Stitt
L. T. Knight

Inventor
Arthur Reed,
By A. L. Jackson,
Attorney

A. REED.
LAND BREAKING PLOW.
APPLICATION FILED APR. 8, 1913.

1,071,576.

Patented Aug. 26, 1913.

2 SHEETS—SHEET 2.

Witnesses
Jr Steel
L. J. Knight

Inventor,
Arthur Reed,
By A. L. Jackson,
Attorney

UNITED STATES PATENT OFFICE.

ARTHUR REED, OF FORT WORTH, TEXAS, ASSIGNOR OF TWO-THIRDS TO BENNETT W. REED AND ONE-THIRD TO ELMER E. THORNTON, BOTH OF FORT WORTH, TEXAS.

LAND-BREAKING PLOW.

1,071,576.  Specification of Letters Patent.  Patented Aug. 26, 1913.

Application filed April 8, 1913. Serial No. 759,609.

*To all whom it may concern:*

Be it known that I, ARTHUR REED, a citizen of the United States, residing at Fort Worth, in the county of Tarrant and State of Texas, have invented certain new and useful Improvements in Land-Breaking Plows, of which the following is a specification.

This invention relates to plows and more particularly to sub-soil plows, and the object is to provide a combined sub-soiling plow various kinds of mold board and disk plows and to provide a subsoiling plow which will effect its own locomotion and draw other plows at the same time.

One object is to provide plows which will break the land to great depths and not turn over the soil, but leave the dirt in practically the same stratum as it is before being broken. One advantage of this breaking the land to great depths is that moisture will be conserved and nitrogen may penetrate the earth and be deposited for plant food.

Other objects and advantages will be fully explained in the following description and the invention will be more particularly pointed out in the claims.

Reference is had to the accompanying drawings which form a part of this application and specification.

Figure 1:
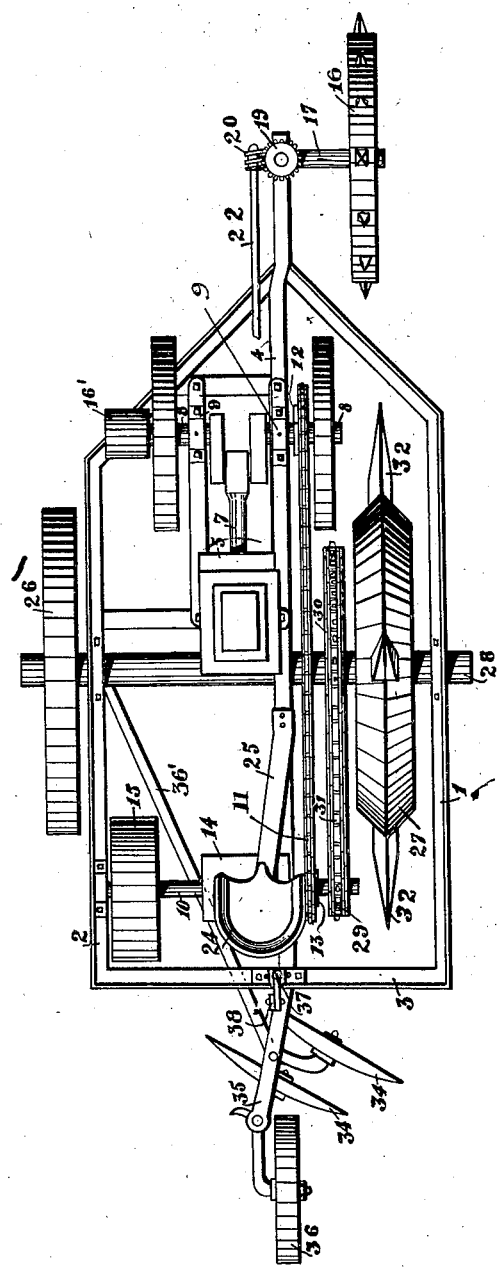
Figure 2:
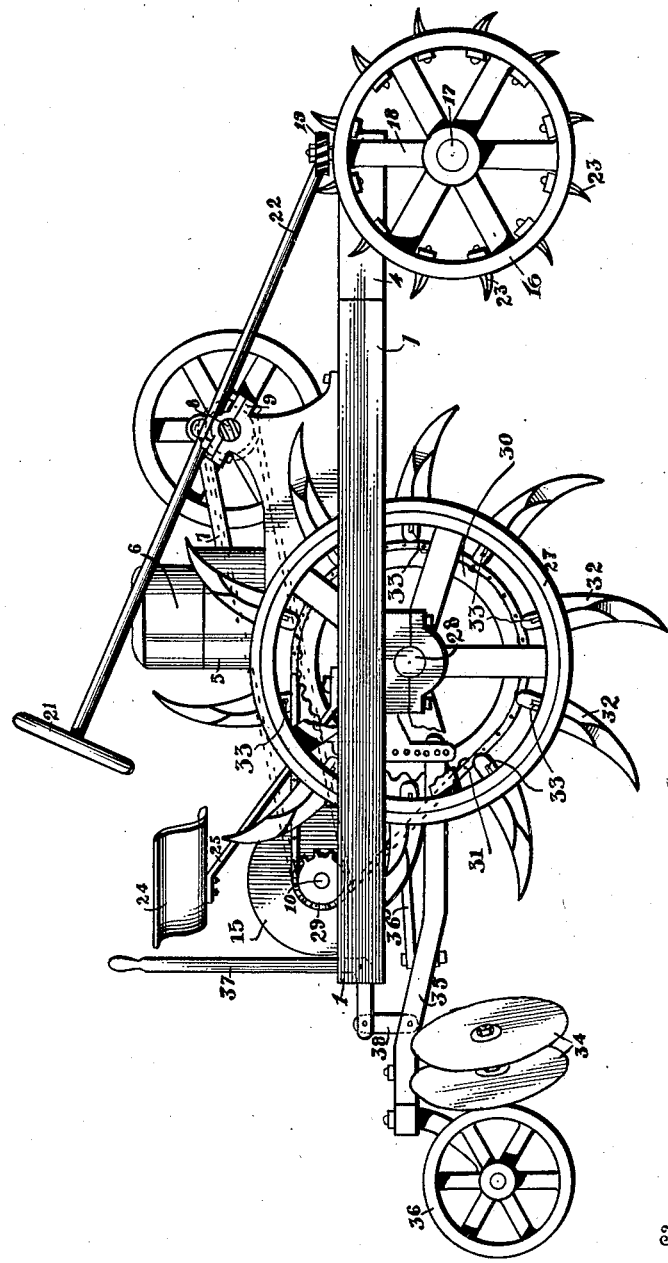

Figure 1 is a plan view of the improved plow. Fig. 2 is a side elevation of the same.

Similar characters of reference are used to indicate the same parts throughout the several views.

The plow is provided with a frame composed of the side beams 1 and 2, a rear beam 3, preferably of angle iron, and a central beam 4. The beams 1 and 2 are bent at angles near the front end and attached to the beam 4. An engine 5 or motor 5 is mounted on the frame and provided with a tank 6 and other necessary parts. The engine drives a crank rod 7 and crank rod 7 drives a crank shaft 8 which is journaled in bearings 9. The shaft 8 is used to drive the shaft 10. The shaft 10 may be driven by a sprocket chain 11 and sprocket wheels 12 and 13 which are rigid respectively with shafts 8 and 10. The shaft 10 is provided with transmission gearing of ordinary type in a casing 14. The shafts 8 and 10 may also be provided with pulley wheels 15 and 16' on which a belt may be used to drive shaft 10. The plow is provided with a steering and guide and supporting wheel 16. This wheel supports the front end of the frame. The wheel 16 is a non-driven wheel and is provided with a shaft 17 which is carried by a vertically disposed frame 18 which is provided with a gear wheel 19 and a worm gear wheel 20 is provided for rotating the wheel 19 to turn the wheel 16 for changing directions. A hand-wheel 21 and a shaft 22 are provided for operating the worm gearing 19 and 20. The frame 18 is pivotally connected to the forward portion of the beam 4. The wheel 16 may or may not be provided with teeth 23. A seat 24 may be attached to the central beam 4 by a shank 25. The main support of the frame of the plow consists of the wheel 26 and the drum 27 which are provided with a shaft 28 and bearings for the shaft 28 are attached to the beams 1 and 2 and 4. The shaft 28 is driven from shaft 10 by means of a sprocket wheel 29, on shaft 10, a sprocket wheel 30 on shaft 28, and a sprocket chain 31 running on these wheels.

The sub-soiling and breaking plows 32 are attached to the drum 27 by keys 33. The plows 32 may be of any suitable length, long enough to break the land 30 inches deep. Disk plows 34 are connected to the frame of the plow by means of a beam 35 and a brace 36'. A gage wheel 36 is provided for the disks 34 and a lever 37 is fulcrumed on the frame and provided with a link 38 pivotally connected thereto and to the beam 35. The plows 34 may be elevated or lowered by the lever 37.

The drum 27 is preferably constructed with an angle faced periphery so that dirt or mud will not cling to the periphery and another advantage is that the angle face will tend to shove stones or rocks to one side or the other so that the drum will not ride up over the stones. The bevel faces which form the angle come to an edge and will aid in splitting or cracking hard dirt.

The plow is shown equipped with an engine or motor for driving purposes. The plows on the drum 27 constitute the traction for moving the plow. But the plow may be drawn by animal power instead of the motor which is mounted on the truck. In case horses or mules are used instead of the motor, the plows on the drum would operate in the same manner but the horses or mules would be the traction power.

The plows 34 make a furrow which is left behind the plows. The guide wheel 16 will run in this furrow when the plow is making the next trip over the ground. The plows 32 on the drum 27 will also follow the furrow so made by the plows 34 and subsoil or break the ground to any depth desirable. The plows 34 come on and cover up the ground which has been broken by the plows 32. The beam 35 is adjustably attached to the beam 4 by means of a link 38 and a lever 37. The beam 35 can by means of adjustment at both ends be adjusted vertically and yet retain its general horizontal position.

A motor is shown for driving the plow. It is apparent that other means may be provided for driving the plow. Draft animals may be used to draw the machine and at the same time drive the plow.

What I claim, is—

1. A wheeled plow comprising a frame, a shaft journaled in said frame, a drum rigid with one end of said shaft provided with land breaking plows and a supporting wheel at the other end of said shaft, a guide and steering wheel in front of said drum, and means for driving said drum.

2. A wheeled plow comprising a frame, a shaft journaled in said frame, a drum rigid with one end of said shaft provided with land breaking plows and a supporting wheel on the other end of said shaft, a guide and steering wheel in front of said drum, and means for driving said shaft consisting of a shaft and a motor driving said shaft, a power transmission shaft driven by said motor driven shaft, and means for transmitting the power from said power transmitting shaft to said drum shaft.

In testimony whereof, I set my hand in the presence of two witnesses, this 31st day of March, 1913.

ARTHUR REED.

Witnesses:
A. L. JACKSON,
J. W. STETT.

---

Copies of this patent may be obtained for five cents each, by addressing the "Commissioner of Patents, Washington, D. C."